United States Patent Office 3,544,634
Patented Dec. 1, 1970

3,544,634
PRODUCTION OF 3-KETOBUTANOL-(1)
Herbert Mueller, Frankenthal, Pfalz, and Harald Koehl, Hermann Overwien, and Horst Pommer, Ludwigshafen (Rhine), Germany, assignors to Badische Anilin- & Soda-Fabrik Aktiengesellschaft, Ludwigshafen (Rhine), Germany
No Drawing. Filed Sept. 11, 1967, Ser. No. 666,966
Claims priority, application Germany, Sept. 15, 1966, 1,277,235
Int. Cl. C07c 49/18
U.S. Cl. 260—594                    9 Claims

ABSTRACT OF THE DISCLOSURE

Production of 3-ketobutanol by reaction of acetone with aqueous formaldehyde solution at temperatures of from 140° to 210° C. and superatmospheric pressure. Methyl vinyl ketone (which can be polymerized to high molecular weight compounds) is prepared from 3-ketobutanol by elimination of water in the presence of aluminum oxide.

---

This invention relates to an improved process for the production of 3-ketobutanol-(1) by reaction of acetone with aqueous formaldeyde solution.

It is known from British patent specifications Nos. 955,449 and 791,541 that 3-ketobutanol together with a major amount of polymethylol compounds is obtained by reaction of acetone with aqueous formaldehyde solution. The 3-ketobutanol can only be recovered from the mixture with polymethylol compounds at great expense. Moreover the yield of 3-ketobutanol-(1) is greatly decreased by the formation of polymethylol compounds. It is also known from U.S. patent specification Nos. 989,993, 2,064,564 and 2,378,206 and U.S. patent specification No. 2,064,564 that 3-ketobutanol-(1) may be obtained from acetone by reaction with aqueous formaldehyde solutions or paraformaldehyde at temperatures of from 0° to 40° C. This method has the disadvantage that the reaction takes several hours. Moreover it is stated in U.S. patent specification No. 2,510,914 that the reaction of acetone with aqueous formaldehyde solution in a column at the boiling temperature of acetone gives good yields of 3-ketobutanol-(1) with reference to formaldehyde used. Owing to the long residence time of the acetone in the column in the presence of alkaline catalysts, a large amount of diacetone alcohol is formed, so that the yield, with reference to acetone used, is far from good. Great waste by formation of diacetone alcohol also occurs when 3-ketobutanol-(1) is prepared by the method described in U.S. patent specification No. 2,395,414 because it is necessary to use a large excess of acetone under relatively strong alkaline conditions in order to obtain good yields with reference to formaldehyde.

The object of this invention is to provide an improved process for the production of 3-ketobutanol in which good yields of 3-ketobutanol are obtained with reference to acetone and formaldehyde. It is another object of the invention to provide an improved process for the production of 3-ketobutanol in which only small amounts of byproducts are formed. It is a further object of the invention to carry out the reaction in a short time.

In accordance with this invention the said and other objects and advantages are achieved in an improved process for the production of 3-ketobutanol-(1) by reaction of acetone with aqueous formaldehyde solution at elevated temperature and at superatmospheric pressure, wherein the improvement consists in carrying out the reaction at a temperature of from 140° to 210° C.

The formaldehyde is used in aqueous solution, preferably concentrated aqueous solution. It is advantageous to use aqueous formaldehyde solution of 30 to 40% by weight strength. In general 4 to 10 moles, preferably 5 to 7 moles, of acetone is used for each mole of formaldehyde, The reaction is advantageously carried out in the presence of an alkaline catalyst. Examples of suitable alkaline catalysts are hydroxides and carbonates of metals of the first main group of the Periodic System, and also hydroxides of the second main group of the Periodic System, and also salts of strong bases with weak acids, such as sodium borate, sodium acetate, sodium formate, secondary sodium phosphate or tertiary sodium phosphate. For example alkali metal alcoholates or organic bases, such as pyridine, quinoline, trialkylamines and basic buffer systems are also suitable. Salts of alkali metals with carboxylic acids, particularly with carboxylic acids having one to four carbon atoms, are preferably used. It is preferred to use 0.1 to 5% by weight, particularly 0.5 to 3% by weight, of alkaline catalyst with reference to the formaldehyde used.

The reaction is carried out at temperatures of from 140° to 210° C., preferably from 160° to 200° C. The pressure used may be the vapor pressure of the reactants at the reaction temperature. It is preferred however to use higher pressures. A pressure higher than the vapor pressure of the reactants can be achieved by forcing in inert gases, such as nitrogen. It is advantageous to carry out the reaction at pressures of 30 to 500 atmospheres, preferably at 100 to 300 atmospheres. When using a catalyst, the reaction period is advantageously thirty seconds to twenty minutes, preferably one minute to fifteen minutes. When the reaction is carried out in the absence of a catalyst, the reaction period is preferably twenty minutes to three hours.

Particularly good yields are obtained by cooling the reaction solution to a temperature below 100° C. within a short time after the reaction, for example within thirty seconds to five minutes, preferably within one minute to three minutes.

The process according to this invention may be carried out for example by heating the reactants, acetone and aqueous formaldehyde, which preferably have been preheated, in the specified amounts in a preheated reactor to the said temperature; the specified amount of alkaline catalyst may be contained in the formaldehyde solution. After the said reaction period, the reaction solution is rapidly cooled to below the said temperature by means of a cooler.

The reaction is preferably carried out continuously by pumping the acetone, aqueous formaldehyde solution and catalyst (when used) in the specified ratio at the said temperature through a bundle of tubes. The cooled solution is worked up by fractional distillation.

When 3-ketobutanol-(1) prepared according to the invention is treated with aluminum oxide at temperatures of 100 to 200° C., methyl vinyl ketone is obtained which is suitable for the production of polymers (cf. Houben-Weyl, Methoden der Organischen Chemie, Georg Thieme Verlag, Stuttgart (1961), volume 14/1, page 1090).

The invention is illustrated by the following examples in which the parts specified are parts by weight unless stated otherwise. Parts by weight bear the same relation to parts by volume as the gram to the liter.

EXAMPLE 1

A mixture of 1,500 parts of acetone, 250 parts of 40% by weight aqueous formaldehyde solution stabilized with 10% by weight of methanol and 3 parts of sodium formate is forced with nitrogen into a pressure vessel having a capacity of 5 parts by volume which has been preheated to 160° C. The reaction solution is heated at 150° C. for eight minutes and at the end of this time is cooled to below 100° C. within two minutes. Excess acetone is then distilled off and the residue is fractionally distilled in vacuo. 218 parts of 3-ketobutanol-(1) is obtained which has a boiling point of 85.5° C. at 20 mm. and a refractive index $n_D^{20}=1.4292$. The yield (with reference to acetone reacted) is 92.5% and with reference to formaldehyde 80%.

EXAMPLE 2

A pressure vessel having a capacity of 2 parts by volume is filled with stainless steel wire helices and is fed per hour at 165° C. and 200 atmospheres gauge with a mixture of 167 parts of 37% by weight aqueous formaldehyde solution and 1,450 parts of acetone. The reaction solution obtained is cooled to below 100° C. within two minutes and then worked up by distillation. 106 g. of 3-ketobutanol-(1) having a boiling point of 85° C. at 20 mm. is obtained per kilogram of reaction solution. The yield is 93% with reference to acetone. Conversion of formaldehyde is complete.

EXAMPLE 3

The apparatus described in Example 2 is fed at 200° C. and 300 atmospheres gauge with a mixture of 335 parts of 37% by weight aqueous formaldehyde solution and 2,900 parts of acetone per hour. The reaction solution obtained is cooled to below 100° C. within two minutes and then worked up by distillation. 107 g. of 3-ketobutanol-(1) is obtained per kg. of reaction solution. The formaldehyde is completely reacted. The yield is 91% of the theory with reference to acetone.

We claim:

1. An improved process for the production of 3-ketobutanol-(1) which comprises reacting 4 to 10 moles of acetone with 1 mole of formaldehyde in concentrated aqueous solution at a temperature of from 140° C. to 210° C. and at a pressure from the vapor pressure of the substances used at the temperature used up to 500 atmospheres, said reaction being carried out in the presence of an alkaline catalyst for a period of time of about 1 to 15 minutes and then cooling the resulting reaction mixture within 30 seconds to five minutes to a temperature below 100° C.

2. A process as claimed in claim 1 wherein 5 to 7 moles of acetone is used per mole of formaldehyde.

3. A process as claimed in claim 1 wherein the formaldehyde is used in 30 to 40% by weight aqueous solution.

4. A process as claimed in claim 1 wherein a pressure of from 30 to 500 atmospheres is used.

5. A process as claimed in claim 1 wherein 0.1 to 5% by weight (with reference to the formaldehyde used) of alkaline catalyst is used.

6. A process as claimed in claim 1 wherein said reaction is carried out at a temperature of 160° to 200° C.

7. A process as claimed in claim 1 wherein said reaction is carried out with about 5 to 7 moles of acetone per mole of formaldehyde at a pressure of about 30 to 500 atmospheres and in the presence of about 0.1 to 5% by weight, with reference to the formaldehyde, of an alkaline catalyst.

8. A process as claimed in claim 7 wherein the formaldehyde is used in a 30 to 40% by weight aqueous solution.

9. A process as claimed in claim 8 wherein said reaction is carried out at a temperature of from 160° C. to 200° C.

References Cited

FOREIGN PATENTS 381,686    6/1932    Great Britain.
955,449    4/1964    Great Britain.

OTHER REFERENCES

Eigenberger et al., Chem. Ber., vol. 77B, pp. 331 to 334 (1944).

BERNARD HELFIN, Primary Examiner

W. B. LONE, Assistant Examiner